Dec. 27, 1949     I. I. GRASHEIM     2,492,742
RADIO FREQUENCY BYPASS CAPACITOR
Filed April 13, 1946
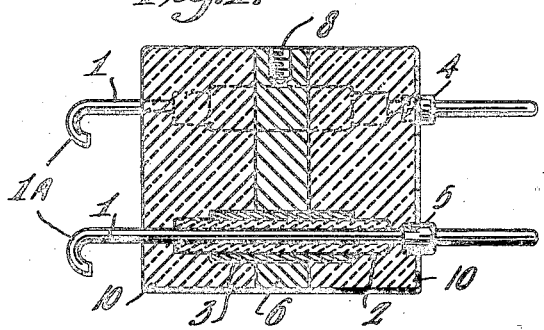
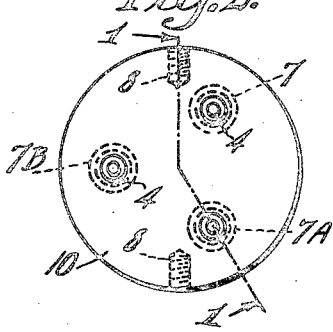
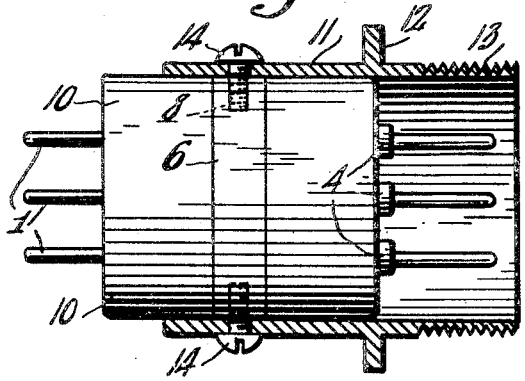
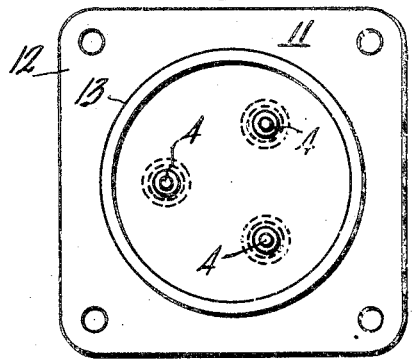
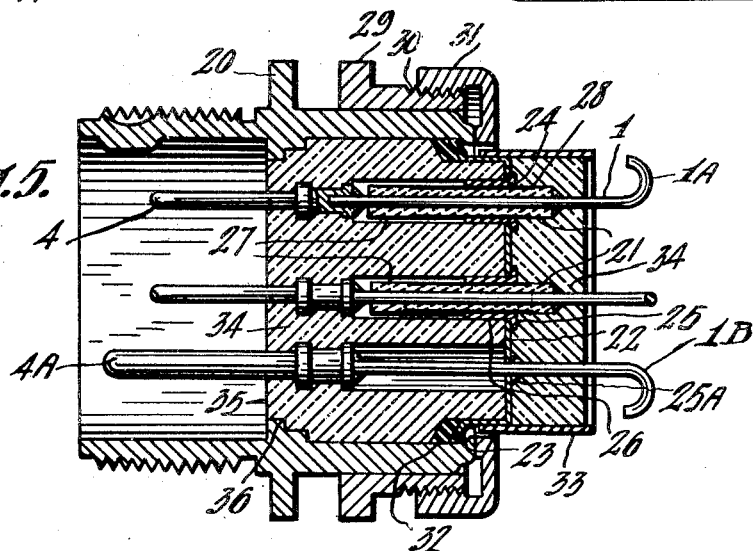
INVENTOR
*Irvin I. Grasheim*
BY *H. S. Grover*
ATTORNEY Patented Dec. 27, 1949

2,492,742

UNITED STATES PATENT OFFICE 2,492,742

RADIO-FREQUENCY BYPASS CAPACITOR

Irvin Isadore Grasheim, Camden, N. J., assignor to Radio Corporation of America, a corporation of Delaware Application April 13, 1946, Serial No. 662,045

2 Claims. (Cl. 175—41)

This invention relates to new and useful bypass capacitors which are particularly adapted for radio frequency circuits.

An object of this invention is to provide improved bypass capacitors which may be employed with electrical cable connectors.

A feature of this invention is the arrangement of the bypass capacitors with standard terminal cable connectors wherein the bypass capacitors are arranged to form a part of each lead of the cable.

Prior art bypass capacitors are not suitable for use in high radio frequency circuits for the reason that the inductance of the capacitor connection leads generally nullify the use of the capacitor. This invention reduces the capacitor lead inductance to a minimum by making one of the capacitor electrodes part of the cable lead.

This invention will be more clearly understood by referring to the accompanying drawings, in which:

Fig. 1 is a longitudinal elevation partly in section of one of the through bypass capacitors of this invention, Fig. 2 is a front elevation of Fig. 1, Fig. 3 is a side elevation showing the bypass capacitors of Figs. 1 and 2 placed within a standard terminal connector, Fig. 4 is an end view of Fig. 3, and Fig. 5 is a cross sectional view showing a preferred form of the capacitors of this invention assembled and molded within a standard terminal connector.

Referring now in detail to Fig. 1 of the drawing, three through bypass capacitors are shown, each one of which comprises a through connection lead 1 which is either a round metal rod or a wire, the diameter of the rod being substantially the same as the cable terminal. The rod 1 serves as one of the capacitor electrodes. A sleeve 2 of insulation material, preferably that of a ceramic having a high dielectric constant, surrounds rod 1 and serves as the capacitor dielectric; the length of the dielectric is made slightly shorter than that of rod 1. The rod 1 is bent over to form a hook 1A which provides a convenient connection point for the cable lead. Surrounding the dielectric 2, there is arranged another electrode in the form of a metallic ground sleeve 3 or tube. The tube 3 has an inside diameter substantially the same as the outside diameter of the dielectric 2. The length of the ground sleeve 3 is made shorter than that of the dielectric 2. The entire capacitor is suitably impregnated by any well known wax method after assembly. The type and amount of impregnation is such as to prevent the entry of moisture, at twenty pounds per square inch of air pressure. A threaded male pin 4 is soldered to one end of rod 1 by placing its end within the threaded aperture 5. If desired, a female member may be substituted for the pin.

The capacitors are each retained in a desired spaced relationship by a metallic disc 6 which is silver plated and is preferably constructed of copper or other metal of good conductivity. The disc 6 is provided with three apertures 7, 7A and 7B, which apertures are of sufficient size to receive the outer portion of ground sleeve 3. The ground sleeve 3 is soldered to disc 6 in the position shown. The outer periphery of member 6 is provided with suitable tapped holes 8 for securing the assembled capacitors to a standard terminal cable fitting.

As shown in Fig. 1, the capacitors are assembled by placing each one centrally within the apertures 7 so that the ends stick out substantially equally on both sides. The disc and the projecting capacitors are then placed within a suitable mold and the entire unit (with the exception of the central rod members which projects outwardly therefrom) is then molded to the shape shown by Figs. 1 and 2. The molded material is preferably a phenolic condensation product 10 or any suitable insulating material having the necessary requisite insulating qualities.

As mentioned above, the bypass capacitors can be molded in either the male or female side of a cable connector. By molding the capacitors around the conductor itself and within the cable, it is possible to obtain the shortest possible ground lead for radio frequency currents. Also, adaptor plates may be used on standard cable plugs.

Referring now to Fig. 3 of the drawings, the molded plastic assembly 10 is shown placed within a standard terminal cable connector 11 which is generally constructed of metal having a flanged portion 12 and a threaded portion 13 to provide the suitable securing means for the terminal connector. The entire assembly of capacitors are secured within the terminal connector 11 by means of a plurality of screws 14 which pass through the wall of member 11 and into the tapped holes 8 of metallic disc 6. As generally used in most radio frequency circuits, the standard terminal cable connector 11 is maintained at ground potential. Therefore, it will be seen that by means of screws 14, the disc 6 and also the outer sleeve 3 is likewise maintained at ground potential thereby permitting radio frequency currents passing through the conductors 1 to be bypassed to ground. The capacity from rods 1 to the outer shell 11 is approximately 1,800 micromicrofarads. The capacitors are tested with a flash test of 1,500 volts direct current. The operating voltage is 350 volts direct current.

Although Fig. 1 of the drawings shows the bypassing of only three terminal connectors, any number of terminals can be bypassed to ground by providing additional apertures in the metallic ground plate 6.

Referring now in detail to the preferred form of capacitors of the invention, as shown by Fig. 5, nine bypass capacitors 21 are used in bypassing a nine wire cable. The capacitors are assembled within a standard terminal connector 20. To simplify the showing of Fig. 5, only two capacitors and an enlarged ground terminal are shown. The two capacitors 21 are of slightly different construction than those mentioned above in connection with Figs. 1 and 2 for the reason that for economy in quantity production, the center disc or plate 6 is substituted by a relatively thin sheet of metal 22 which is punched out to provide a flanged edge 23 and apertures 24. The inner electrode or rod which is provided with a hook portion IA is retained concentrically within the aperture 24 by means of an eyelet 25 having a long sleeved portion 26 and a ceramic tube 27 constructed of titanium dioxide material having a high dielectric constant. The ceramic tube 27 has an outer silver coating 28 which is soldered to eyelet 25 and serves as the outer electrode of the capacitor. The terminal connector 20 is provided with a flange portion 29, the upper portion of which is threaded at 30 to receive a clamp nut 31. The clamp nut 31 is for the purpose of gripping the outer metallic sheath of the cable (not shown). A rubber gasket 32 is provided to prevent entry of moisture into the inner portion of the standard terminal connector. A metallic cylinder 33 surrounds the flanged portion of plate 22 and forms an enclosing member in which a moisture sealing compound 34 is placed hermetically to seal the capacitors. The lower portion of rod I is soldered to threaded male pins 4 in the same manner as mentioned above in connection with Fig. 1. The capacitor and terminal portion of the terminal connector member 20 is also sealed with a phenolic sealing compound 34 to a level 35. The sealing compound is retained by means of an inner anchorage flange 36.

The bypass capacitors of this modification are assembled by first placing the ceramic tube 27 in its proper position on rod I. A pin terminal member 4 is then soldered to the lower end of rod I. The eyelet 25 is inserted in an aperture 24 and the eyelets are then soldered to the plate or disc 22. The ceramic tube and rod I together with the pin 4 are retained in the proper position by a suitable jig or fixture (not shown). After the apertures 24 are all filled with bypass capacitors, the capacitor portions on the left-hand side of the disc 22 are sealed by pouring into the cylinder 20 the sealing compound 34, to the level indicated at 35, in order to prevent moisture from entering the capacitors. After this side has been cooled, the device is then turned over. The right-hand side is filled with compound 34 to the top level of cylinder 33.

When it is desired to have one of the pins serve as a ground connection, the eyelet 25 and ceramic tube 27 are omitted and rod IB is soldered at 25A to disc 22. A larger diameter pin 4A is provided to prevent making an error when inserting the terminal connector in its operating position.

As mentioned above, only two capacitors and a ground terminal are shown by Fig. 5, although a greater number of capacitors may be employed.

What is claimed is:

1. An electrical cable capacitor for bypassing radio frequency currents from each conductor of said cable directly to ground at the termination of the cable leads, comprising a cylindrical metallic cable terminal member, a disc of metal having substantially the same diameter as the inside diameter of said cylindrical metallic cable terminal member, said metallic disc having a plurality of symmetrically arranged apertures therein, a plurality of capacitors of the type having an inner electrode with a hook-shaped end and an outer electrode with a dielectric interposed therebetween, said hook-shaped ends of the inner electrode being arranged for connection to each conductor of said cable, the outer electrode of said capacitor being secured within the apertures of said disc and in electrical contact therewith, an insulating medium surrounding said capacitors, the inner electrode hook-shaped ends of said capacitors being arranged to project beyond said insulating medium, securing means for said disc passing through the wall of said cylindrical metallic cable member, whereby electrical connection is made from the outer electrodes of said capacitors to said metallic cable terminal member, a metallic terminal pin secured to the end of said inner electrode of each capacitor opposite the hook-shaped ends, and a metallic terminal member which is of a different size than that of said terminal pins also passing through an aperture in said disc, whereby an electrical connection is made to ground the outer electrodes of all said capacitors.

2. An electrical cable capacitor for bypassing radio frequency currents from each conductor of said cable directly to ground at the termination of the cable leads, comprising a metallic cable terminal member, a metal plate having substantially the same outside area as the inside area of said metallic cable terminal member, said metallic plate having a plurality of apertures therein, a plurality of capacitors each having an inner electrode and an outer electrode with a dielectric interposed therebetween, one end of the inner electrode being arranged for connection to each conductor of said cable, the outer electrode of said capacitor being secured within the apertures of said disc and in electrical contact therewith, an insulating medium surrounding said capacitors, said inner electrode ends of said capacitors being arranged to project beyond said insulating medium, securing means for said plate passing through the wall of said metallic cable member, whereby electrical connection is made from the outer electrodes of said capacitors to said metallic cable terminal member, a metallic terminal pin secured to the end of said inner electrode of each capacitor opposite the first mentioned ends, and a metallic terminal member also passing through an aperture in said plate, whereby an electrical connection is made to ground the outer electrodes of all said capacitors.

IRVIN ISADORE GRASHEIM.

REFERENCES CITED

The following references are of record in the file of this patent:

UNITED STATES PATENTS

| Number | Name | Date |
|---|---|---|
| 1,717,701 | Dubilier | June 18, 1929 |
| 2,089,264 | Ingmanson | Aug. 10, 1937 |
| 2,186,578 | Doughman | Jan. 9, 1940 |
| 2,270,953 | Manz | Jan. 27, 1942 |
| 2,288,969 | Kirkwood | July 7, 1942 |
| 2,346,162 | Hanopol | Apr. 11, 1944 |
| 2,411,861 | Antony | Dec. 3, 1946 |
| 2,419,018 | Gudie | Apr. 15, 1947 |
| 2,421,780 | Frear | June 10, 1947 |